(12) United States Patent
Pascale et al.

(10) Patent No.: US 6,238,076 B1
(45) Date of Patent: May 29, 2001

(54) COMPACT LIGHT MIXING AND DIFFUSING APPARATUS

(75) Inventors: Danny Pascale; Jean-Pierre Vandelac, both of Montreal (CA)

(73) Assignee: Primetech Electronics, Inc., Quebec (CA)

( * ) Notice: Subject to any disclaimer, the term of this patent is extended or adjusted under 35 U.S.C. 154(b) by 0 days.

(21) Appl. No.: 09/280,102

(22) Filed: Mar. 29, 1999

(51) Int. Cl.[7] ....................................... F21V 7/04
(52) U.S. Cl. .............................. 362/558; 362/26; 362/276; 362/555; 362/560
(58) Field of Search ............................... 362/555, 558, 362/560, 31, 276, 26; 340/814.45, 814.75

(56) References Cited

U.S. PATENT DOCUMENTS

| | | |
|---|---|---|
| 3,746,853 | 7/1973 | Kosman et al. . |
| 4,218,726 | 8/1980 | fukasawa et al. . |
| 4,630,895 | 12/1986 | Abdala, Jr. et al. . |
| 5,070,431 | 12/1991 | Kltazawa et al. . |
| 5,084,698 | 1/1992 | Sell . |
| 5,251,117 | 10/1993 | Nagai . |
| 5,280,230 * | 1/1994 | Mahoney ................................ 320/14 |
| 5,325,271 * | 6/1994 | Hutchisson ............................ 362/32 |
| 5,349,504 | 9/1994 | Simms et al. . |
| 5,404,277 | 4/1995 | Lindblad . |
| 5,414,598 | 5/1995 | Anderson . |
| 5,481,440 | 1/1996 | Oldman et al. . |
| 5,592,578 | 1/1997 | Ruh . |
| 5,655,832 | 8/1997 | Pelka et al. . |
| 5,949,346 * | 9/1999 | Suzuki et al. .................... 340/815.45 |

* cited by examiner

*Primary Examiner*—Stephen Husar
*Assistant Examiner*—John Anthony Ward
(74) *Attorney, Agent, or Firm*—Kudirka & Jobse, LLP (57) ABSTRACT

The present system provides a compact light diffusing and mixing structure for uniformly dispersing light at an exit surface, the apparatus having a light entrance surface which faces a light exit surface located on the opposite side of the light diffusing and mixing structure; a beam splitter light guide assembly located between the entrance and exit surface; a reflective surface located adjacent to the beam splitter light guide assembly. The light diffusing structure works such that light entering the entrance surface on striking the beam splitter light guide assembly is directed in part directly towards the exit surface and in part towards the reflective surface which in turn directs the light towards the exit surface and thereby evenly diffusing or dispersing the light across the exit surface. The system also provides a compact fast battery charger for Ni-MH and NiCAD batteries. The charger can indicate the degree of charge of the battery during a charging state and a discharging state.

23 Claims, 9 Drawing Sheets

COMPACT LIGHT MIXING AND DIFFUSING APPARATUS

FIELD OF THE INVENTION

The present invention relates to a compact light mixing and diffusing apparatus typically used for small low power sources of illumination. More particularly it relates to a compact apparatus for providing diffused light of substantially uniform brightness and substantially uniform color at an exit surface of a visual indicator of an appliance.

BACKGROUND OF THE INVENTION

Visual indicators are often used in small electronic appliances, such as razors, modems, computers, audio and video equipment etc, to indicate that the appliance is powered ON or is in some given state. The visual indicator, which the user sees on the appliance, is generally of small size and of simple circular or square geometry. Often the appliances are powered by batteries for ease of use or to minimize cost or power requirements; thus, small low power drawing sources of illumination are used, such as light emitting diodes (LEDs). However, given the small size, illumination characteristics and illumination power, these light sources require enhancement to meet visual and aesthetic requirements for the appliance. Thus, to enhance these visual indicators the appliances use light diffusing apparatuses with the light source.

The visible surface of the light diffusing apparatus is usually located flush with the surface of the appliance enclosure. The light diffusing apparatus can be either attached to the enclosure or to a printed circuit board (PCB) along with the illumination source, typically a light emitting diode (LED). The apparatus is generally made of optically clear polymers (acrylic, polycarbonate, etc) and is shaped in such a way that the output of the LED is distributed uniformly across the visible exit surface which is grounded to enhance visibility.

A light pipe is a commonly used light diffusing apparatus which provides significant manufacturing advantages. Light pipes economically adapt the emission pattern of a standard off-the-shelf LED. LEDs usually have a radiation pattern of circular or elliptical symmetry with a maximum intensity on the optical axis (an axis which is usually normal to the exit window of the LED) which decays to zero at a direction of 90 degrees from the axis of illumination. A light pipe adapts the emission pattern of an LED to the esthetic requirement of a visual indicator by guiding the LEDs output to create a uniform illumination across the entire surface of the visual indicator. Light pipes also increase the area over which the light from the LED is spread allowing the visual indicator to be significantly larger than the LED which provides the illumination. Light pipes offer other advantages in that they provide a link between the LED, preferably soldered to the PCB, and the indicator position on the surface of the appliance's enclosure. The light pipe also facilitates the appliance's assembly and, in the case where it is attached to the enclosure, no mechanical contact to the PCB is required.

In many instances, it is necessary to have an indicator which can vary the color it displays. One standard method involves using an off-the-shelf dual color LED (two LEDs mounted in a single package) and fitted with a glass filled clear epoxy lens. The exit surface illumination and color uniformity is good. However, there are many limitations. The glass filled epoxy is a bulk diffuser i.e. light is diffused in all directions through the solid and is visible from all surfaces, thus lowering illumination efficiency. The LED has to be soldered to the PCB, which limits the packaging flexibility, and the indicator shape which the user of the appliance sees at the surface of the appliance is limited to the standard catalog shapes (usually square, rectangular or round). Moreover, there are no dual color LED packages with large-size diffusing lenses, that can extend through enclosures walls for instance, which are available in Surface Mount Technology (SMT) packages (with no leads).

SMT LED packages are very small, varying in size from a fraction of a mm up to about 6 mm for each side. The distance between the optical axis of two individually packaged SMT LEDs mounted side by side is about 0.5 mm to 1 mm. For two or three LED's mounted in the same package, the distance between their optical axis is around 0.7 mm to 0.8 mm. The most common two LEDs packages are bicolor (some packages have two LEDs of the same color), with orange, red and various tints of green being the most common colors. In the case of a red and green bicolor LED, varying the ratios of red and green creates a color, where the LED beams overlap, with a tint which can be continuously adjusted from green to red with the intermediate tints of yellowish green, yellow, amber, and orange. Three LED packages are usually tricolor with one of each LED of red, green, and blue color (blue LEDs devices are currently significantly more expensive than red and green devices); mixing all colors results in a white output and a partial mix of the three colors can generate almost any visible spectrum color. One obvious market for the tricolor LEDs is imaging displays where the representation of pictures or video content requires a full color capability. The color mixing capabilities of the light pipe then becomes a critical performance factor. However, even with such small distances between the optical axis as the ones described previously, good overlap is not obtained with most commercially available light pipes, which were designed for the more common single color LED packages, and multiple colors can be viewed on the exit surface instead of one solid uniform color.

Figure 1:
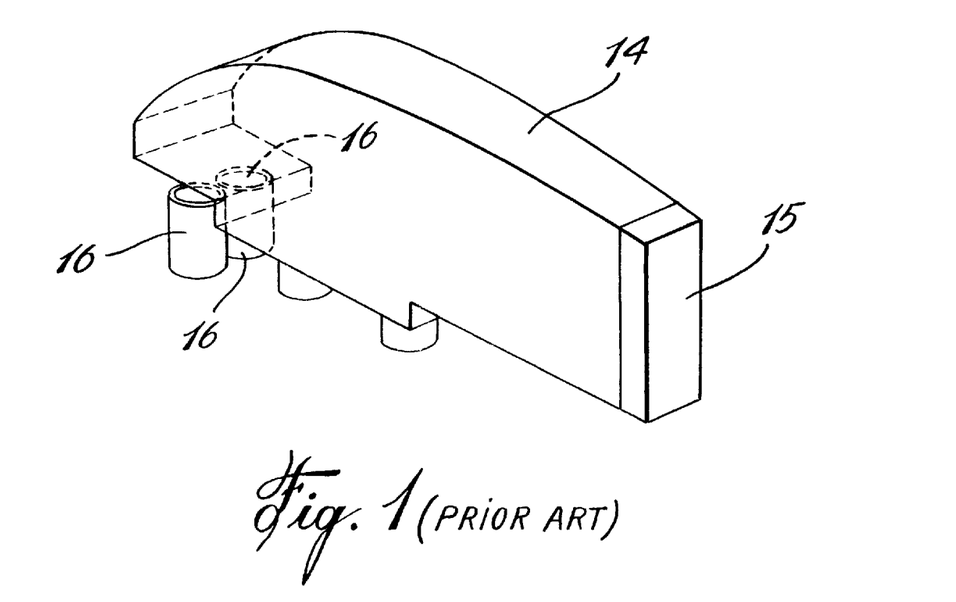
FIG. 1 depicts a prior art light diffusing device.

Given the current state of the art, light pipes used for single color indicators on most small electronic appliances have a small visible exit surface. In most cases, the exit surface 15 is located at the end of a relatively long section 14 of FIG. 1. The long section 14 is required to homogenize the LED output and the relative size of the exit surface 15 is small compared to the length of the mixing section 14. Another example with similar characteristics is U.S. Pat. No. 5,581,683 granted to Bertignoll et al on Dec. 3, 1996, which contains a description of a uniform light pipe with an exit surface of 3.3 mm×51.5 mm; illumination is provided by two LEDs 16 located at the end of a U-shaped plate 50 mm away from the exit surface.

The example of the preceding paragraph both use Total Internal Reflection (TIR) as the mechanism to bend the light rays emitted from the source in order to obtain uniform illumination at the light pipe exit surface. TIR, a well know scientific principle, will be present whenever a light ray strikes a surface at an angle less than a critical angle, measured relative to a tangent at the surface encountered by the light ray, when going from a high refractive index medium to a low refractive index medium, in this case from the light pipe polymer to air. If the angle is larger than the critical angle with respect to a tangent at the point of the surface the light ray strikes, the light ray will be refracted and will escape from the light pipe. However, if the light ray strikes at a smaller or shallower angle than the critical angle it will be reflected. Thus, in constructing a light pipe based on TIR it is thus important to eliminate all abrupt angular changes on the light pipe structure, which factor results in the long structures of the prior art.

A large area linear light pipe is proposed by Simms in U.S. Pat. No. 5,590,945. The device is essentially a flat plate illuminated from its end and which has an accurate rear reflecting surface covered with triangular reflecting ridges which deflect the light toward the front surface. It is said that the design can also be used with multicolored light sources such as bicolor or tricolor LEDs. However, this apparatus cannot be scaled down because the triangular ridges become almost impossible to manufacture with precision, in a common plastic injection process, when features dimensions need to be 0.5 mm and smaller. Such small ridges would be required for a device where deflection has to be performed within a distance of about 20 mm or less. Also, in this apparatus, light mixing is favored by the large dimensions of the structure, which is designed for highlighting an automobile dashboard or console; a small scale version of the apparatus would show non uniform color mixing. Finally, in many electronic appliances, it is preferable to locate the LED substantially under the light pipe whereas this apparatus is designed for the packaging constraints of an automobile dashboard.

Both a uniform large viewing area and efficient color mixing is obtained with apparatuses described by Koike in U.S. Pat. No. 5,542,017. These apparatuses use nonuniform bulk scattering where scattering is progressively higher as the light rays are farther from the light source. The applications are primarily for thin plate illumination devices used for Liquid Crystal Display backlighting. Illumination is from the edge and a mirror is proposed on the plate bottom to enhance brightness. Fabrication of the nonlinear bulk scattering media is most effective in simple geometry diffusers, especially if a mirror is added to enhance brightness; the cost can easily become prohibitive when the light pipe complexity increases, in non-symmetric three-dimensional shapes for example, and for appliances which are offered in a highly cost-competitive market.

Figure 2:
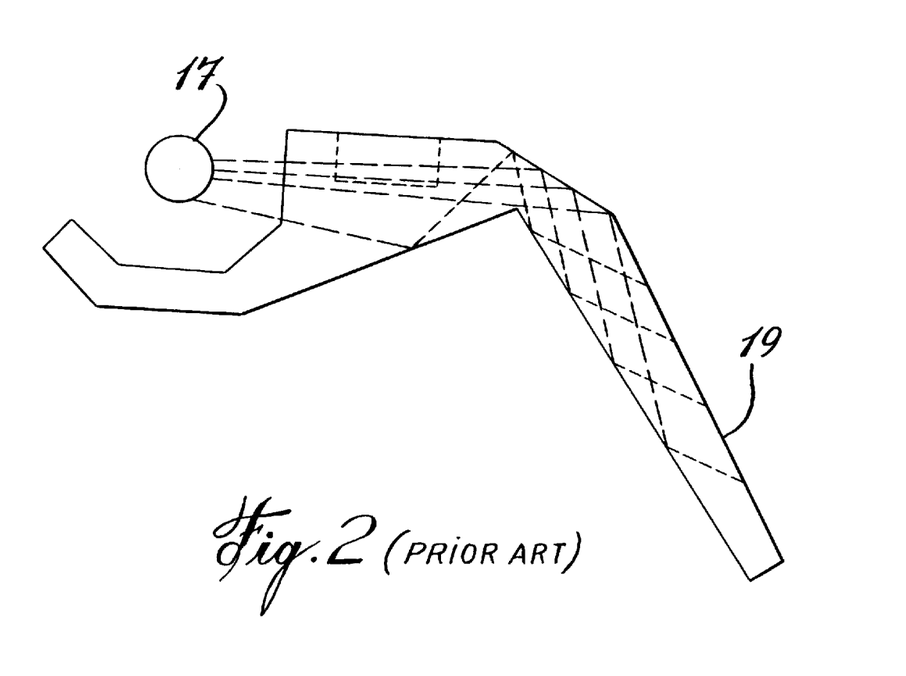
FIG. 2 depicts another prior art light diffusing device.

Another approach proposed by Anderson in U.S. Pat. No. 5,414,598 for large area illumination and LCD display backlighting is to use an imbedded beam-splitter to divide the spot light into multiple sub-beams. Two sub-beams are created by reflection on a triangular opening (hole) within the light pipe, which has its apex aligned to the light source optical axis, and the remaining of the beam continues directly into the structure. All reflections are created by TIR. The three sub-beams are then redirected into a large flat plate type area where the bottom surface is light diffusing. The apparatus does not provide a color mixing mechanism and it would be very sensitive to the alignment of the multiple light sources relative to the triangular beam-splitter apex. In fact one of the claimed advantages of this invention is that it only uses one light source. Additionally, as depicted in FIG. 2, of the light pipe of Anderson, the light from the light source 17 must pass through a long convoluted chamber before reaching the exit surface 19.

Thus, there is a requirement for a compact light pipe which would not only provide a uniform illumination over its exit surface but would also exhibit good color uniformity in the case where multiple light sources of various colors are used simultaneously. A light pipe or light diffusing and mixing structure which also eliminates the need for a long and convoluted dispersing and mixing channel. A structure where the light source can be positioned so that it faces the exit surface and is a short distance from the exit surface.

Light pipes, such as those described above and the ones described herein, are often used on consumer products. In particular, they are used in small hand-held consumer products such as electric razors, hand-held recorders, cordless or cellular telephones and similar devices. The light pipes are often used to provide backlighting or to indicate some state that the device is in at the particular time, such as a recording state for a hand-held recorder or a battery charging or discharge state, etc. The light illumination devices, or light sources used with light pipes are generally LEDs, and are usually powered by the same batteries which power the hand-held consumer device. In particular, two common and popular batteries used in such devices are nickel cadmium (Ni-CAD) and nickel metal hydride (Ni-MH). Often, it is desirable and in some instances a practical necessity to indicate the state of charge of the battery which powers the device. The obvious choice for indication of the state of charge of a battery is in many instances a light pipe with an appropriate visual display and an LED which provides the light source of illumination of the light pipe.

In systems currently in use monitoring is often performed using a programmed electronic micro-controller or dedicated application specific integrated circuit (ASIC). Mathematical integration forms the basis of the monitoring scheme. The monitoring schemes quite often measure time spent in discharging the battery and subtract that from the time spent in the charging mode. Quite often, the discharge time and charging time are first multiplied by appropriate weighting factors before the subtraction is performed. These particular weighting factors are often derived from assumptions on the current magnitude drawn from or delivered to the battery in each of the modes. In the most elaborate schemes, the actual current, delivered or drawn, is measured to determine the weighting factors.

However, the implementation of these schemes is generally quite costly and thus only economically feasible for expensive hand-held consumer products. Often, for less expensive models, a voltage based monitoring scheme of the battery is used. However, in order for the battery to provide useful power the battery must provide an almost constant voltage when discharging. In fact, battery manufacturers strive to provide batteries which discharge at a constant voltage. However, production of a battery with a perfectly constant voltage is nearly impossible. Thus, in reality, the discharging profile of a fully charged Ni-CAD or Ni-MH battery will, with a constant load, have the following profile:

(a) first, the voltage decreases rapidly, (b) then the steep decrease subsides and the voltage falls very slowly for most of the discharge cycle of the battery, and (c) at the end of the discharge cycle, the voltage again starts to decrease rapidly again.

Thus, in reality, these voltage-based schemes can only provide a fairly reliable indication of charge at the beginning of the discharge cycle when the battery is fully or nearly fully charged, and at the end of the discharge cycle when the battery is completely or almost completely drained. Consequently, most implementations of a voltage-based indicator only provide a low battery indicator.

Similarly, monitoring the voltage of a battery while it is being charged has the same or similar problems. Namely, it is easy to determine when the battery is fully discharged at the beginning of the charging process and to also determine with reasonable certainty that the battery has been fully charged at the end of the charging process However, it is difficult to monitor the progress of the charging of the battery during the long intermediate portion of the charging process.

Thus, what is needed is a fast and efficient voltage-based scheme to monitor the state of charge of a battery or batteries during the charging and discharging states. An inexpensive scheme which will provide a reasonably accurate indication of the state of the battery, whether in the charging or discharging state, and which will not draw too much power from the battery is desired.

SUMMARY

Thus it is an object of the present invention to provide a small compact light diffusing and mixing device, which can provide uniform illumination of light at an exit or visual display surface.

It is yet another object of the present invention to provide an apparatus and method in which the intensity and uniformity of light on a visual display of a light diffusing and mixing apparatus is not affected by variations in the placement of the light source with respect to the light entrance surface of the visual display within certain tolerances. This object is advantageous when the light diffusing apparatus is mounted to a housing and the light source is mounted to a PCB inside the housing in a manufactured article.

It is a further object of the present invention to provide an apparatus which can uniformly mix light from two or more different colored light producing sources and, by varying the intensities of the light sources, can create different colors of light which present a uniform hue and color at a visual display surface.

It is another object of this invention to provide a single variable signal to control two or more different color sources to produce another color.

It is yet another object of the present invention to provide a light diffusing and mixing apparatus which has a visual display significantly larger than the light source and light entrance surface of the apparatus.

It is a further object of the present invention to provide a light diffusing or mixing device which has a compact design which eliminates the need for a long convoluted mixing chamber and the light entrance surface and the visual display can be placed opposite but facing each other.

The present invention accomplishes these and other objectives in part by providing a compact light diffusing and mixing structure for uniformly dispersing light, form a light source, at an exit surface. The compact light diffusing and mixing structure has a light entrance surface and a light exit surface. Between the entrance and exit surface the compact light diffusing and mixing structure has a light dispersing assembly which breaks up light into a plurality of sub-beams having different directions. A light spreading reflective surface is located in the light diffusing and mixing structure adjacent to the light dispersing assembly. The light diffusing structure works such that light, from the light source, on entering the entrance surface strikes the light dispersing assembly and a first portion is guided towards the exit surface and a second portion is guided towards the light spreading reflective surface which in turn spreads the light towards the exit surface and thereby evenly spreads the light across the exit surface. A proportion of light in said sub-beams is substantially independent of a precise alignment of the light source with respect to the entrance surface, and the exit surface is substantially larger than the entrance surface.

In a further aspect of this invention the beam splitter light guide assembly has a light guide sandwiched between a first and a second beam splitter and the curved surface includes a first curved surface adjacent to the first beam splitter and a second curved surface adjacent to the second beam splitter, wherein the light guide conveys that portion of the light going directly towards the exit surface and the first beam splitter diverts a portion of the light towards a first curved surface which in turn directs the light towards the exit surface and the second beam splitter diverts a portion of the light towards the second curved surface which in turn directs the light towards the exit surface. In yet an additional aspect of the invention it can be appreciated that the curved surface can, in certain device configurations, be replaced by a flat surface positioned at an angle of substantially 45 degrees relative to the entrance surface.

In yet other aspects of this invention the entrance and exit surface have a texture which further enhances their light diffusing and mixing capabilities. Also, the light source is placed adjacent to the entrance surface in a position where it illuminates the entire entrance surface.

In another aspect of the present invention it uses two or more light sources, and it varies the intensities of these two or more light sources to produce different colors on the visual display which appear as solid single colors.

In another aspect of the present invention it provides a method for mixing and diffusing light in a small area to provide uniform illumination on a visual display. The method includes the steps of: generating at least one light beam; breaking the at least one beam of light into a plurality of sub-beams having different directions and proportions of light substantially independent of a position of said at least one light beam within a predefined area; diffusing the plurality of sub-beams in a predefined pattern so that the cross sectional area of each of the plurality of beams increases to a predetermined size; projecting the plurality of sub-beams onto a visual display surface in an additively uniform pattern; and whereby the sub-beams of light striking the visual display present a uniformly intense dispersion of light across the visual display and the area of a plane of the visual display is substantially larger than a cross sectional area of the at least one beam of light generated.

In a further aspect of this method two or more different light sources are provided the intensity of which can be varied to different colors of uniform hue on the visual display. The invention also provides a variable color indicator comprising a light mixing and diffusing apparatus, two different color light sources arranged to direct light at the entrance window of the apparatus, and a circuit controlling the intensity of the light sources to produce a desired color on the exit surface in response to a variable color control signal. The light sources comprises LEDs and the circuit comprises a pulse width modulation (PWM) intensity signal for powering a first LED and an inverter for inverting the PWM intensity signal for powering the second LED.

In yet another aspect of this invention it provides an indicator device with two or more light sources of different colors; a light pipe with a light exit surface and an entrance surface of the light pipe receiving light from the two or more light sources. The light pipe mixes light from the light sources. The light exit surface being positioned for viewing by a user of an electronic apparatus and the electronic apparatus has circuitry operatively connected to a single variable signal representing a state of the apparatus. The circuit in turn is operatively connected to the light sources which light sources are each responsive to an intensity control signal generated by the circuit in response to the single variable signal indicative of the state, such that the light sources produce at the exit surface of the light pipe a unique color visual indication of the state.

In another aspect of this particular version of the invention the state the single variable signal is indicative of is the state of charge of a battery which powers the electronic apparatus.

In yet another aspect of this version of the invention, the state of charge of the battery of which the signal is indicative is the state of charge of the battery during a charging of the battery. In a further aspect of this invention the two or more light sources are a first LED and a second LED, and the variable signals generated by the circuit in response to the single variable signal are a first signal which causes the first LED to lose intensity during the charging of the battery and turn off when the battery is fully charged, and a second signal which causes the second LED to turn on and increase in intensity during the charging of the battery, whereby the hue of light created at the exit surface by the mixing of the light from the LEDs by the light pipe is indicative of the charge of the battery.

In yet another aspect of this invention the state of charge of the battery of which the signal is indicative is the state of charge of the battery during discharging of the battery. In further aspect of this invention the two or more light sources are a first LED and a second LED, and the variable signals generated by the circuit in response to the single variable signal are a second signal which causes the second LED to lose intensity during the discharging of the battery and turn off when the battery is fully discharged, and a first signal which causes the first LED to turn on and increase in intensity during the discharging of the battery, whereby the hue of light created at the exit surface by the mixing of the light from the LED=s by the light pipe is indicative of the charge of the battery.

BRIEF DESCRIPTION OF THE DRAWINGS

The invention will be better understood by an examination of the following description, together with the accompanying drawings, in which.

DETAILED DESCRIPTION OF THE PREFERRED EMBODIMENT

I. The Light Pipe

Figure 3:
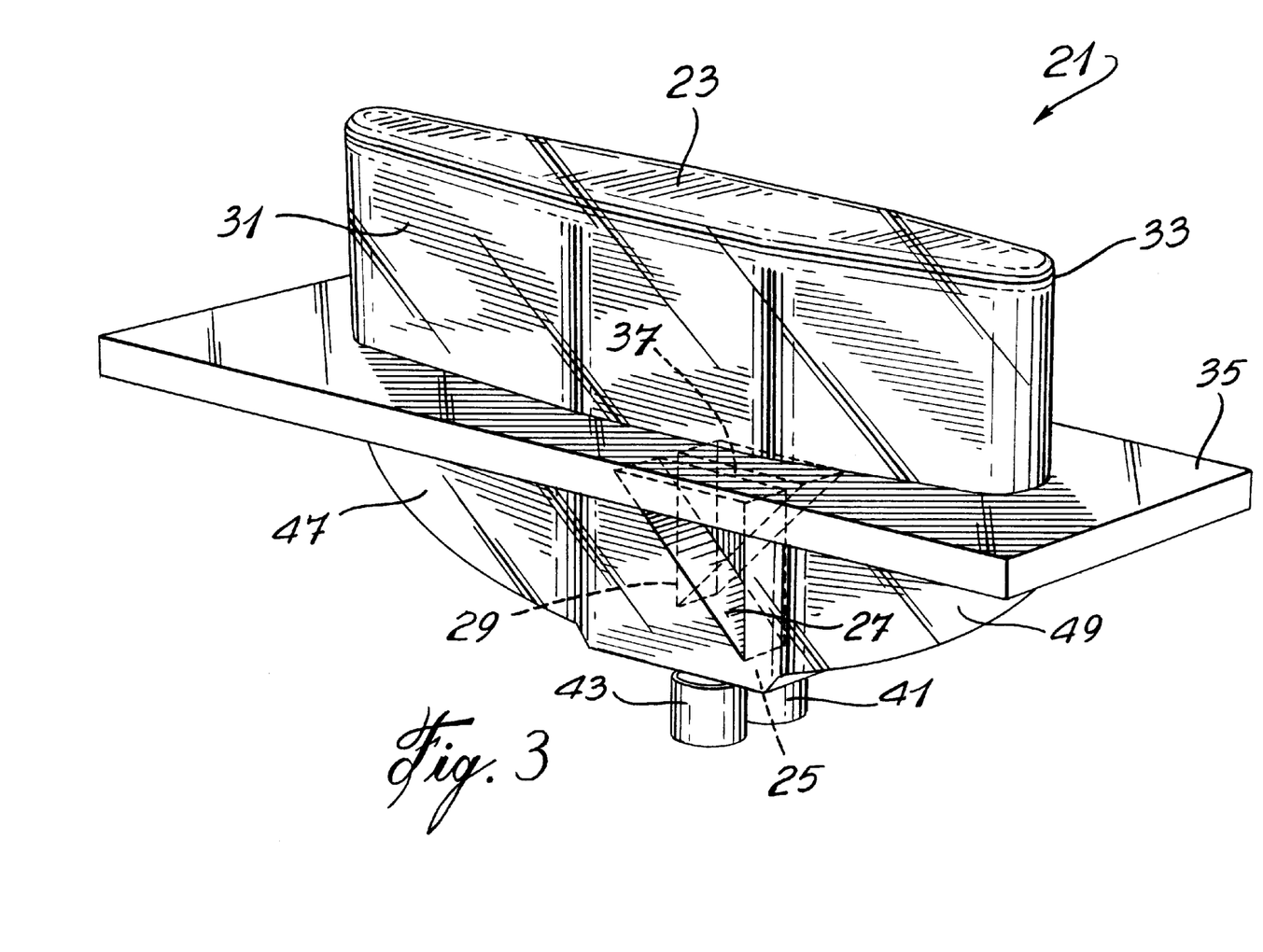
FIG. 3 is a perspective view of a preferred embodiment of the present invention.
Figures 4, 5, 6, 7, 8:
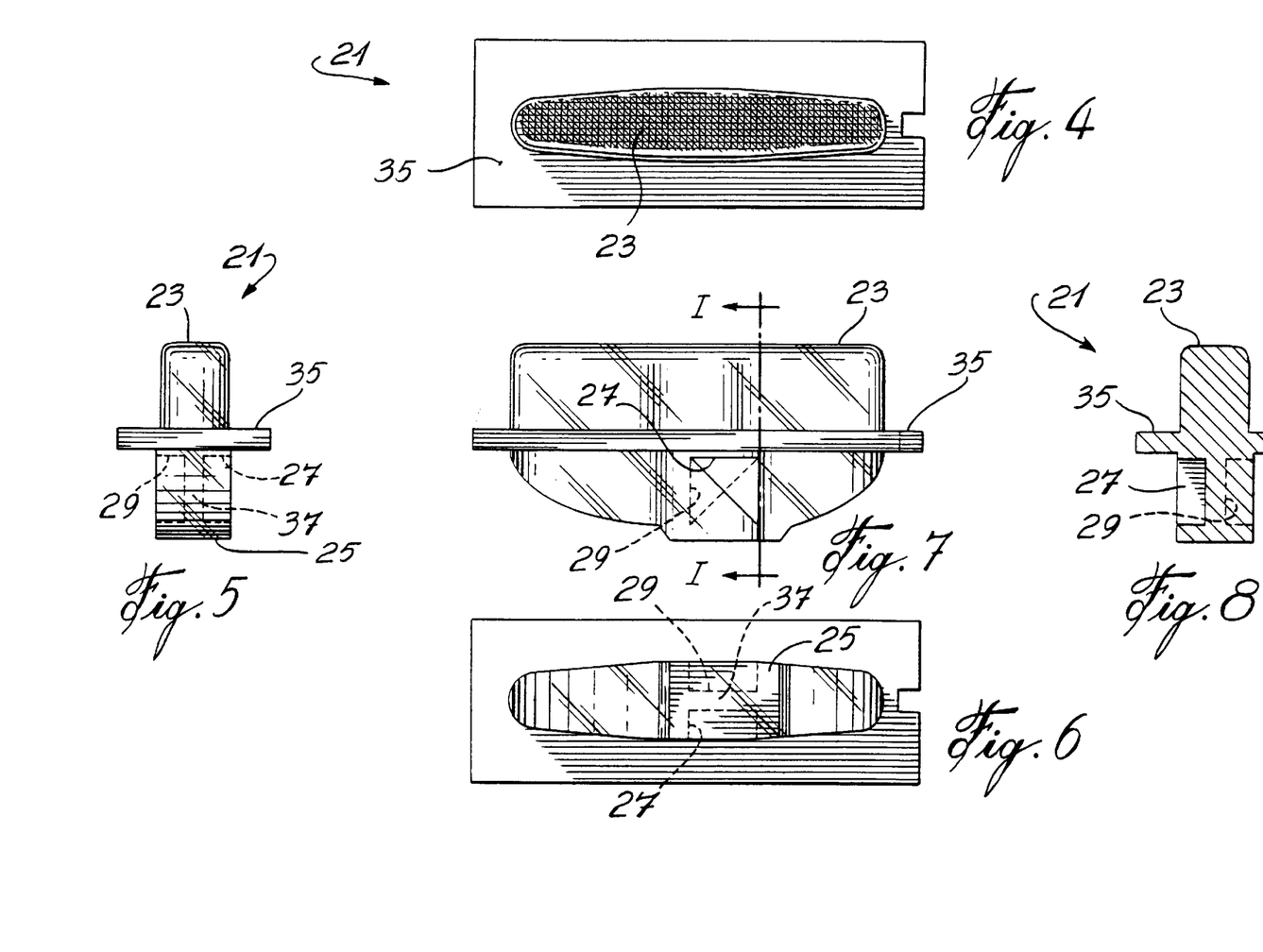
FIG. 4. is a view of the top of the present invention, which surface forms the exit surface.
FIG. 5 is a view of the end of the present invention.
FIG. 6 is a view of the entrance surface of the present invention located at the bottom of the present invention.
FIG. 7 is a side view of the present invention.
FIG. 8 is a cross sectional view of the present invention taken at I–I' in FIG. 7.

FIG. 3 provides a view of one preferred embodiment of the present invention 21. Light is projected into the light pipe 21 through the entrance surface 25 located at the bottom. The light after being dispersed and mixed by the internal structure of light pipe 21, as will be described in detail below, leaves the light pipe at surface 23 in a uniform pattern. Some of the entering light is directed by the beam splitters 27 and 29 to curved surfaces 47 and 49 (which could also be flat surfaces orientated at substantially 45 degrees relative to the entrance surface 25). The curved surfaces 47 and 49 in turn reflect the light towards the exit surface 23. The structure 21 also has a central light guide or channel 37 which some of the light passes through directly from the entrance surface 25 to the exit surface 23. Light guide or channel 37 is that portion of the light pipe 21 sandwiched between beam splitters 27 and 29.

The light dispersing and mixing structure 21 which can also be called a light pipe is made of a transparent material. Any number of materials currently available and familiar to those skilled in the art can be used. Among the possible choices are: clear polycarbonate (i.e., Lexan™ from the General Electric Corporation); acrylic (i.e., Plexiglass™ of Rohm Haas); styrene acrylonitile thermoplastic (i.e., Lustran™ from the Bayer Corporation); amorphous thermoplastic derived from methyl metacrylate, a form of acrylic; and Acrylonitrile/Butadiene/Styrene (ABS) (i.e., Terlux™ from the BASF Corporation). Injection molding provides the preferred method of manufacturing.

One of the unique features of the subject invention is its compact size and design. Unlike the light diffusing and mixing devices described above, in the present invention the light exit 23 and entrance surfaces 25 face each other and are not separated by a long convoluted channel. In the preferred embodiment depicted in FIGS. 3 to 11 the exit surface 23 and the entrance surface 25 form parallel planes only 7 mm apart. Additionally, the exit surface 23 is substantially larger than the entrance surface 25. The exit surface 23 is 12 mm by 3 mm while the entrance surface 25 is only 3 mm by 3 mm, making the exit surface four times the size of the entrance surface. In the preferred embodiment, the exit surface can be up to six times the size of the entrance surface. Thus, the light pipe 21 offers highly desirable features of compactness, simplicity of design and size of viewing area not previously available.

One or more light sources 41 and 43 are positioned under the light dispersing structure 21 opposite entrance surface 25. Thus, light from sources 41 and 43 enters through the flat entrance surface 25 located at, or near, the center of the bottom of the structure 21, see FIGS. 3, 6, 9, 9A and 9B. The distance between the light sources light emitting diodes (LEDs) 41 and 43 of FIG. 3 and the light pipes entrance surface 25 is sufficiently large so that each source illuminates the entire entrance surface. It was experimentally verified that a 0.5 mm to 1.5 mm distance was acceptable for light sources which have an emission angle of 120 degrees at full width and half intensity. This creates a range around the entrance surface 25 where the light source or sources can be placed and still produce optimal output at exit surface 23. Thus, the light pipe of the present invention does not require precise positioning or alignment between the light sources 41 and 43 and the entrance surface 25. The system has significant tolerances built into it with respect alignment of the light sources and entrance surface. This offers distinct advantages over the current art. The quality, uniformity and intensity of the light presented at the exit surface 23 then is invariant with respect to the positioning of the light source within a certain range.

Figure 9:
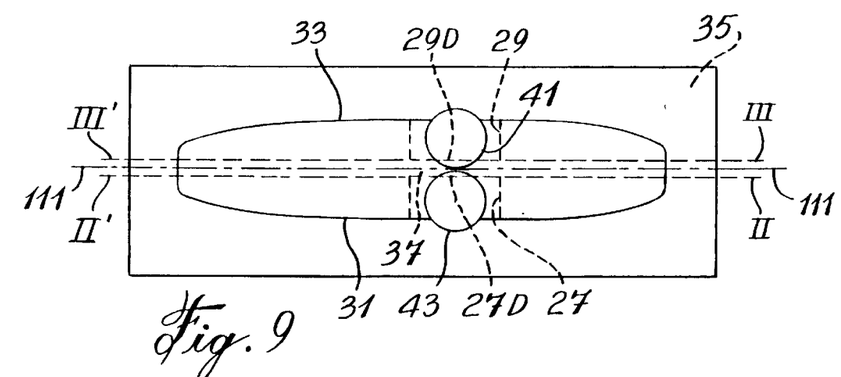
FIG. 9 is a view of the bottom of the present invention with light sources placed adjacent to the entrance surface of the present invention.
Figure 9A:
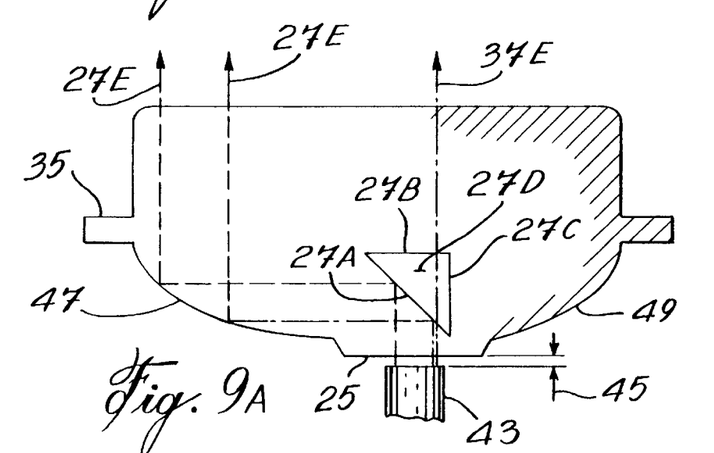
FIG. 9A is a cross sectional view of the invention taken along line II–II' in FIG. 9.

As discussed above the beam-splitter light channel assembly 27, 37 and 29 located near the entrance surface 25 separates the incoming light from each source into three sub-beams. In the preferred embodiment, the beam splitters are formed by two triangular cavities 27 and 29 positioned on each side of the light pipe 21 adjacent to the entrance surface 25. One surface of each triangle cavities 27A and 29A respectively is positioned at an angle of substantially 45 degrees relative to the plane of the input surface 25. As depicted in FIGS. 9A and B, each of the surfaces 27A and 29A generate respectively the two major sub-beams 27E and 29E. As previously noted there is also a region, in the center of the light pipe between the two triangular openings, which functions as a flat plate light guide 37, where part of the incoming light is channeled directly towards the exit surface 23. This forms a third sub-beam 37E. As depicted on FIGS. 9A and 9B, the third sub-beam passes between the two beam splitting structures 27 and 29 passing through the narrow and long channel 37 directly to the exit surface 23.

Figure 9B:
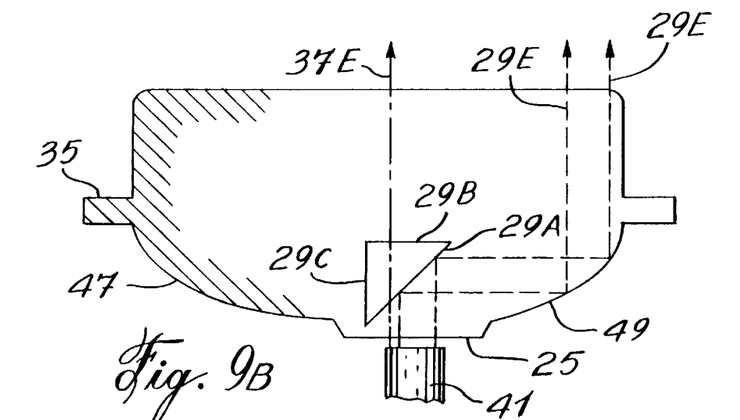
FIG. 9B is a cross sectional view of the invention taken along line III–III' in FIG. 9.
Figure 10:
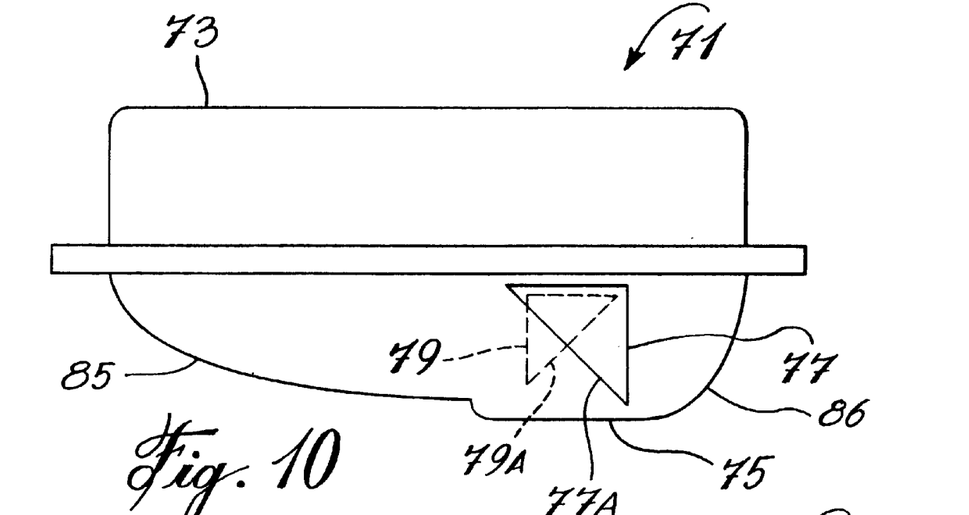
FIG. 10 shows a side view of a highly asymmetrical version of the present invention.
Figure 10A:
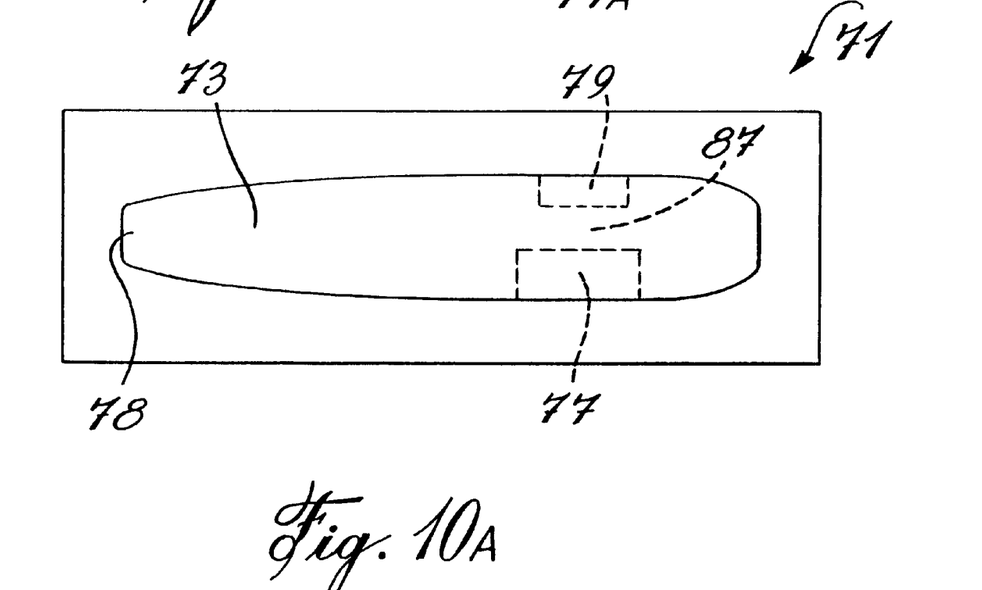
FIG. 10A shows a top view of the highly asymmetrical version of FIG. 10.

The substantially 45 degrees reflecting or active surfaces 27A and 29A of the triangular cavities 27 and 29 are positioned in such a way that they each reflect beams, 27E and 29E, which are at an angle of substantially 180 degrees relative to each other. Reflection is achieved under the principles of total internal reflection (TIR) where, as described previously, a light ray will be reflected if its angle of incidence relative to the tangent of the surface is smaller than a critical angle. Since in most embodiments there will be no aluminized or mirror coating on the substantially 45 degrees reflecting surfaces, some rays will be refracted through the surface. This situation is not necessarily detrimental since it does, in effect, separate the input beams into additional, minor, sub-beams which can contribute to further disperse and mix the light resulting in better illumination uniformity on the exit surface 23. In fact, at all of the surfaces light will have a tendency to diffuse. The light entering at entrance surface 25 will not be a collimated parallel beam due to the LED source. The light rays will enter the entrance surface 25 at various angles and will disperse as they move up through the light pipe 21. Some will disperse up through light channel 37 and spread out as the light moves towards surface 23. Some of the light will strike angled surfaces 27A and 29A of each beam splitter and be in part refracted as well as reflected. The refracted rays strike the surface at an angle larger than the critical angle.

The two major sub-beams 27E and 29E deflected by active surfaces 27A and 29A of the triangular openings are further reflected by the curved shape surfaces 47 and 49 formed at each end of the bottom surface of the light pipe 21. In the preferred embodiment the curved surfaces 47 and 49 have a substantially parabolic shape. The parabolic shape is configured in such a way that the light rays 27E and 29E are deflected, also by TIR, toward the exit surface 23 on the top of the light pipe 21. In the preferred embodiment each curved surface 47 and 49 are configured such in relation to the beam directed towards them by beam diverters 27 and 29 that they direct the beams they reflect towards the exit surface 23. They reflect the beams at an angle towards the exit surface 23, they spread the reflected beam out over the exit surface in a fairly uniform pattern. In the preferred embodiment the beam diverters are configured such that they direct the light in a collimated beam towards the exit surface. As previously noted the curved surfaces, could in some instances, be replaced by flat surfaces set at 45 degrees to the entrance surface 25.

The combined effect of the beam-splitters 27 and 29 and the parabolic reflectors 47 and 49 provide a uniform illumination of the exit surface for each input source. Additionally, the location and orientation of the beam-splitters effectively mix the beams from the light sources so that the exit surface exhibits a uniform color.

The visibility of the light going out of the exit surface 23 is enhanced by grinding its surface to further diffuse the light. By doing so, there will be no preferred orientation with which to look at the exit surface and the exit surface 23 brightness will appear substantially the same at all angles.

The relative amount of incoming light intercepted by each part of the beam splitters can be adjusted. For example, the sizes of the two triangular cavities would be substantially equal for a nearly symmetric shaped light pipe 21, where the light source or light sources 41 and 43 are located under the center of the light pipe 21. However, for a highly asymmetric light pipe 71 of FIG. 10, the entrance surface 75 would be located more towards one end of the light pipe 71. In such a configuration the light source or light sources would be located under the entrance surface 75 and the size and position of the beam splitters 77 and 79 could be adjusted to achieve the same effect. The beam splitters 77 and 79 thus would differ in size FIGS. 10 and 10A depending on the direction in which they divert the incident light entering through entrance 75. The larger beam splitter 77 being used to divert light towards the longer end 78. Similarly, the size of the flat plate type light channel 87 formed between the two triangular cavities 77 and 79 in the preferred embodiment can be adjusted in relation to the long dimension of the exit surface. The beam splitter 77 requiring a larger active surface 77A off which the light for the most part would be reflected. In the preferred embodiment surface 85 is configured to create a substantially collimated beam. Similarly, the shape of reflecting surface 86 would have to be adapted to assure substantial reflection of the light towards exit surface 73. Similarly an elongated exit surface 73 would more likely impose a narrower central region 87.

Figure 11:
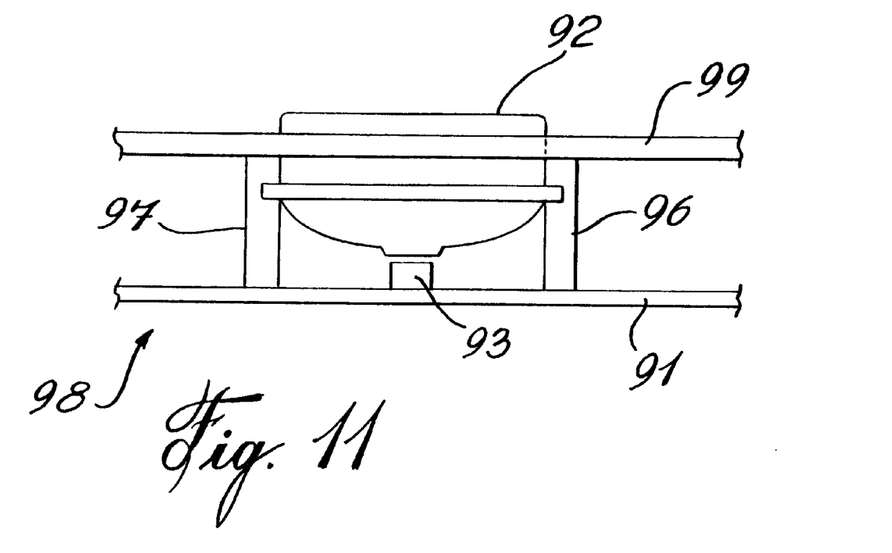
FIG. 11 depicts the present invention mounted on a printed circuit board.
Figure 12:
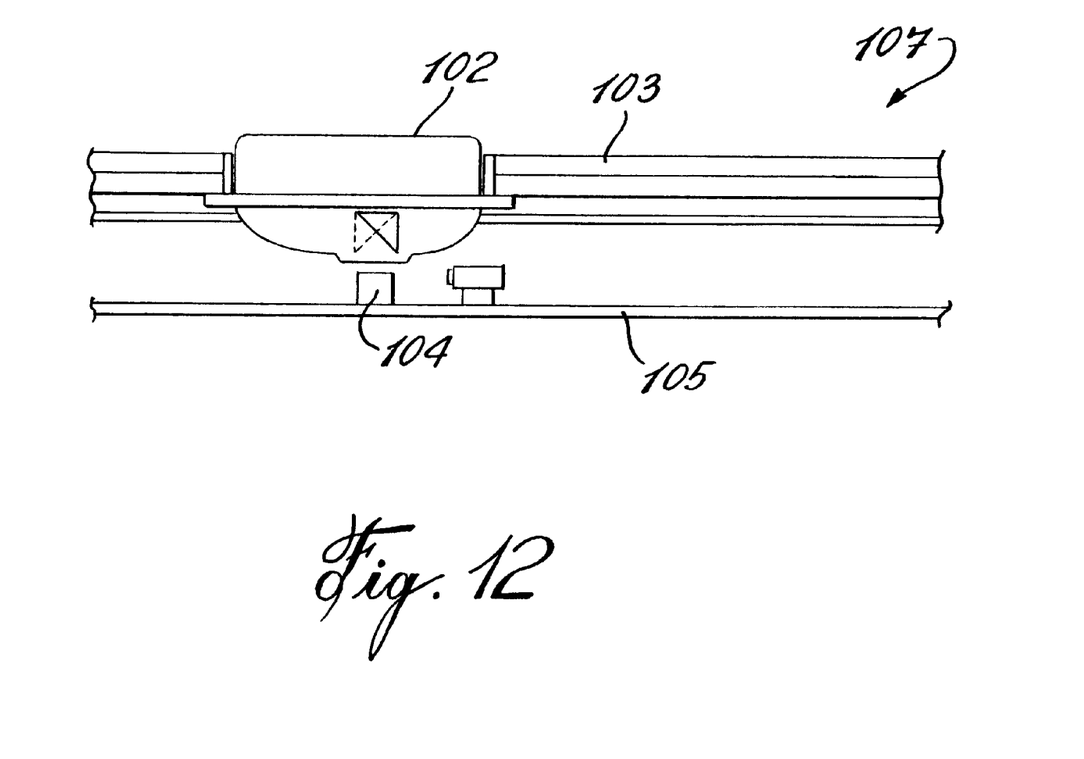
FIG. 12 depicts the present invention mounted enclosure.

The light pipe of the present invention can be configured for attachment to either a printed circuit board (PCB) 91 of FIG. 11 or an enclosure mounting 103 of FIG. 12. As depicted in FIG. 11, the light pipe 92 is mounted to the PCB 91 over the light source 93 with mounting struts 96 and 97. The light pipe 92 then projects through the surface 99 of the appliance 98. Only a portion of the appliance 98 in a cut a way view is shown in FIG. 11 for purposes of illustration.

Referring to FIG. 12, the light pipe 102 can also be embedded in the casing or enclosure surface 103 of the appliance 107. Only a portion of the appliance 107 in a cut a way view is shown in FIG. 12 for purposes of illustration. The light pipe 102 is positioned over the light source 104. The light source 104 being attached to the PCB 105. This mounting configuration is possible even with its larger assembly tolerances because of the rather large tolerance the present invention has with respect to misalignment of the light pipe 102 while still being able to function effectively. As noted previously the position of the light source with respect to the entrance surface can vary substantially and still produce a uniform intensity of light at the exit surface. This results in part from the fact that the light sources do not need to be positioned close to the entrance surface. In effect, a plus or minus 0.5 mm assembly tolerance, in any direction, for the location of the light sources relative to the center of the entrance surface is acceptable.

The light source or LEDs in the preferred embodiment can be positioned in any number of different ways near the entrance surface. In the preferred embodiment the LEDs are positioned as depicted in FIGS. 3, 9, 9A and 9B in a side by side configuration with one under each of the beam splitters. This configuration provides the optimal illumination. They can also be positioned diagonally from each other (not shown). The LEDs can also be aligned along the long axis 111 of FIG. 9 which passes between the beam splitters.

The present invention, given its unique characteristics noted above, allows through the use of different colored light sources, most likely LEDs, generation of different colors at the exit surfaces. The colors so produced are of uniform hues of selected colors. Because of the high tolerances the present invention has with respect to placement of light sources with respect to the entrance surface two or more LEDs 47 and 49 can be placed adjacent to the entrance surface 25 and by varying the intensity of the LEDs, given the excellent diffusing and mixing characteristics of the present invention colors of uniform hue and intensity are produced at the exit surface 23. A combination of LEDs of red and green by varying their respective intensities creates uniform hues of any color in between from yellowish green, yellow, amber, orange etc. Similarly, using three LEDs of blue, red an green allows for the production of any color in the rainbow and the color produced at the exit surface will have a uniform hue of color and intensity. This aspect of the present invention provides the additional advantage in that if two or more LEDs of the same color are used to increase brightness if any should fade or go out the uniformity and general intensity of the light at the exit surface will not be affected.

As noted above the light pipe of the invention described herein does not require precise positioning over the light source to function properly. This aspect of the invention opens up applications which lack the precision of placement required by prior art light pipes. Such applications can include ones requiring movement of the light pipe. Use as a toggle or sliding switch indicative of a state, such as on or off, are thus possible. As a toggle switch two different light sources could be placed under the light pipe with the light pipe shaped as rocker toggle switch and as it is rocked back and forth depending on the function one of the two different colored lights would be on. It also could be used as a sliding switch with the light pipe sliding back and forth wherein with each movement it is placed over one of two light sources which indicate different states. The light pipe in these applications could be placed over the light source in a manner similar to that depicted in FIG. 12 but with the ability to move and function as a switch.

Light pipe 21 has a flange or mounting collar 35 around its center. This flange facilitates mounting and securing the light pipe 21 within the appliance housing or to the PCB to which the light pipe might be attached. The mounting does not effect the operation of the light pipe 21. Other methods of securing the light pipe 21 to the appliance housing are possible; manufacturing the light pipe 21 with the mounting collar an integral part of the light pipe 21 is the preferred and easiest way to do it.

II. Battery Charge Status Indicator

The present invention provides a reasonably accurate efficient and inexpensive method and apparatus to indicate the state of charge of a battery. The basic principle of the present invention applies to both the charging cycle, when a battery is being charged, and the discharging cycle, when it is being used to drive a load. The present invention relies on the intelligence of the user of the electronic device. The present invention in the preferred embodiment provides a visual indicator, such as the light pipe described elsewhere in this specification, illuminated by two different colored LEDs. However, other schemes based on multiple colored lights are possible using the concepts of this invention. In particular a scheme based on three colored lights such as the primary colors of red, blue and green is also possible.

As the battery is being charged, the light intensity of one of the colored light sources is set at a high intensity and is gradually reduced while the other source is off or at an extremely low intensity such that it is not visible at the beginning of the charging cycle but is turned on and its intensity is progressively increased during the charging process. Mixing of the colors with a properly designed optical device or light pipe, such as that disclosed in the present invention, results in the creation of various hues of color at the exit surface of the light pipe which indicate the changing state of charge of the battery. For instance, the preferred embodiment uses a red and green LED. At the beginning of the charging state, the red LED is ON and the green LED is OFF to indicate the battery is fully discharged. (The term "On" herein generally means the LED or light source is producing light of sufficient intensity to be visible to the unaided human eye and the term "OFF" means the LED or light source is not producing light of a sufficient intensity to be visible to the unaided eye although it still may be on in the technical sense.) As the battery is being charged, the relative intensities of both LEDs gradually changes. The red becomes gradually dimmer and the green turns on and becomes gradually brighter. Thus, the user will see at the exit surface of the light pipe a uniform progression from red to orange, to yellow, to green and all of the other intermediate colors created during the entire cycle. The user will thus perceive the many different colors created by mixing various intensities by the light pipe of red and green light. Since perception of color is subjective, the actual color for a given state of charge of the device is not critical. Given the fact that the device will most likely be used by one, or a few people, who will see the device repeatedly charged and discharged, the user will quickly learn the progression of colors associated with his own or her own particular device. Therefore, a simple and inexpensive indication of the battery charge state can result in an aesthetically pleasing and informative color change as the battery is being either charged or discharged.

The invention as indicated above is equally applicable whether the battery is in the charging mode or discharging mode. In the discharging mode as the battery slowly discharges it drives a load as it loses its charge the intensity of one of the colored LEDs will gradually decrease and the intensity of the other LED will gradually increase. In the preferred embodiment a green LED and red LED are used and the reverse of the charging process occurs, such as the exit surface of the light pipe appears green at first as the green LED is only ON at full intensity to indicate a fully charged battery. Subsequently, the red LED gradually increases in intensity as the green LED decreases in intensity, the exit surface of the light pipe then shows the reverse of the charging process with a gradual transition from green through the intermediate colors between red and green to red when the battery is fully discharged.

The present invention has three preferred embodiments: one which provides circuitry for indicating the state of a battery in a charging mode. A second preferred embodiment which provides circuitry to indicate the state of the battery in a discharging mode. Finally, there is a combined circuitry which provides the appropriate apparatus to monitor the state of the battery in both a charging and a discharging mode.

A. Charge Mode:

In the preferred embodiment, the single variable signal which is used to control the LED intensities and give a color indication of charge status is a charge control signal of a charging circuit described in Applicant's co-pending provisional patent application Ser. No. # 06/105,402 filed on Oct. 23, 1998 hereby incorporated by reference.

During the charging of a battery, the voltage of the battery has a tendency to rise to such high levels that the battery will eventually be damaged if the voltage is not regulated. To prevent the battery voltage from exceeding this maximum level many charging schemes, during the charging process, suspend charging when the battery voltage reaches a maximum level. In these schemes, charging starts again when the voltage of the battery falls to a predetermined minimum level. The predetermined minimum level is usually the sustainable voltage level of a fully charged battery. Thus, the charging scheme may cycle through a series of ON-OFF cycles to charge the battery.

When the charging of a battery, which has been totally discharged, commences the voltage is quite low and the charger will initially be ON continuously to provide a continuous current or voltage to charge the battery until the maximum voltage level is reached. Subsequently, it moves into a taper charging period during which it cycles through ON and OFF phases, the ON time gradually decreases. Near the end of the charging process, the OFF cycles become much longer and the ON cycles become much less frequent, at this point the charging process stabilizes as a trickle charge state.

The preferred embodiment utilizes the above described ON-OFF behavior of the charging process to indicate the state of charge of the battery during the charging process. In the preferred embodiment, as noted above, it uses a red LED and green LED and turns on the red LED and has the green LED turned off when the battery is being charged. When the battery is not being charged it turns off the red LED and turns on the green LED. By selecting an appropriate timing sequence for this ON-OFF cycle, of the circuit charging the battery, the exit surface of a light pipe used to mix the light from the two LEDs will display during the charging process a uniform transition from red through all of the intermediate colors created by combing red and green to green at which point the battery is fully charged.

At the start of the charging process during the fast charge state the red LED is only on. This fast charge state, depending on the battery and its characteristics can last from 5 to 10 minutes to roughly half an hour (in the case of a battery for a small low power appliance). Subsequently, during the taper charge phase of the charging process the duty cycle of the charging process decreases such that frequency of the ON or active charging period decreases and the OFF period of the charging process increases in duration. In the taper charge period the ratio of OFF periods to the ON periods monotonically iincreases. In the trickle charge phase the OFF cycles become so long in comparison to the occasional ON cycle that the exit surface eventually appears green indicating the battery is fully charged.

Figure 13:
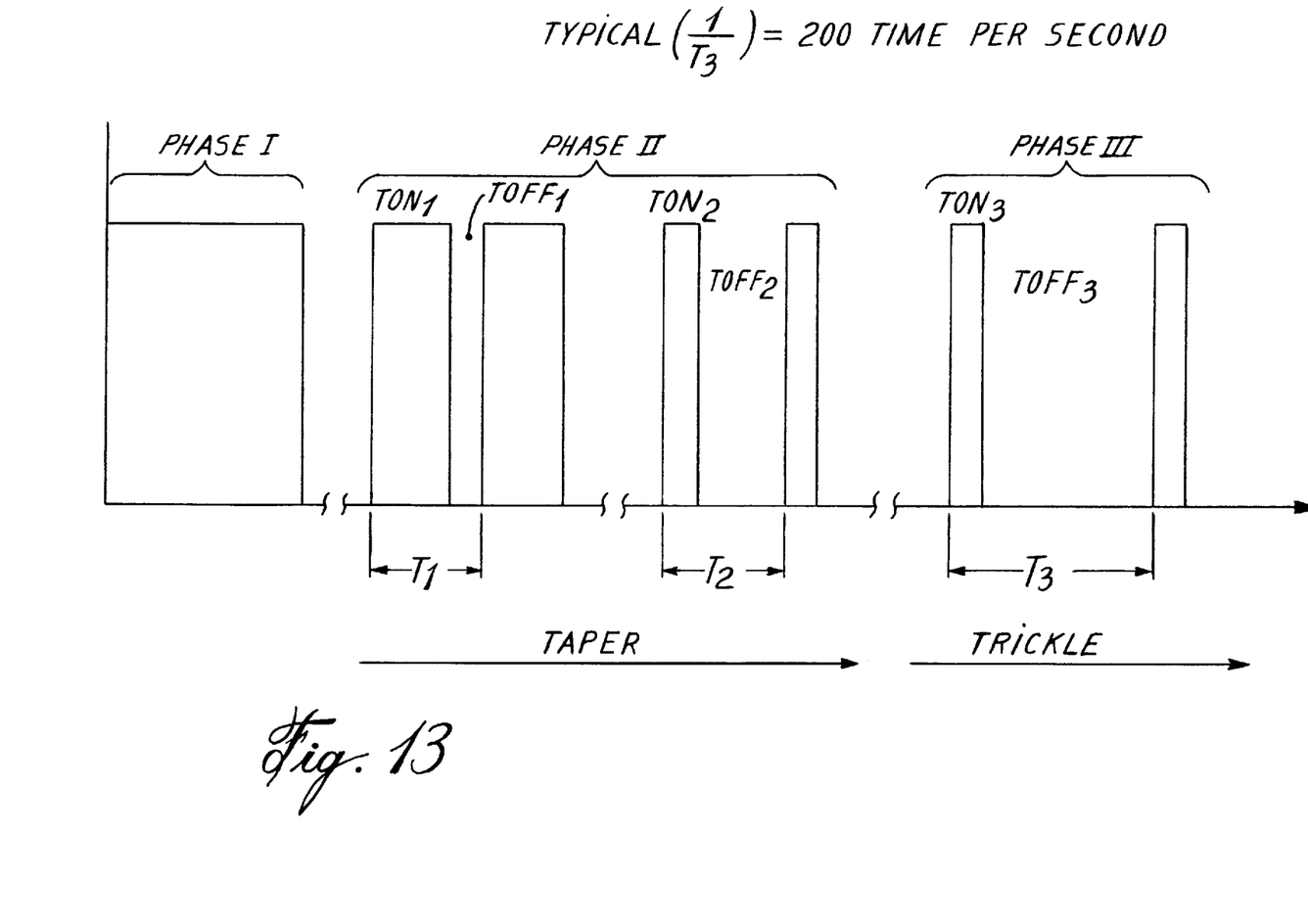
FIG. 13 a graph of portions of a current timing diagram during a battery charging process.

FIG. 13 provides a diagram of portions of the current and voltage signals respectively during the fast charge phase I, the taper charge phase II and the trickle charge phase III of a typical battery charging sequence. The preferred embodiment of the present invention uses a charging current signal as depicted in FIG. 13 to control the red and green LEDs. The square wave forms in FIG. 13 indicate when the current is active and charging the battery. When the charging current is ON, during $t_{on}$, the red LED is turned ON and the green LED is turned OFF. When the charging current signal is OFF, during $t_{off}$ the red LED is shut OFF and the green LED is turned ON.

During the fast charge phase I the current is ON the entire time so only the red LED is ON. It will be appreciated by those skilled in the art that actual current in any ON phase or pulse maybe provided in short rapid burst which to all intents and purposes appear as a steady current for the purposes of this discussion. In the preferred embodiment when the voltage reaches 2.97V (i.e., charging two series connected AA series Ni-MH or Ni-CAD cells), the maximum level, the current shuts OFF and the fast charging phase I ends. The taper charge phase II begins and the current remains off until the battery voltage falls to 2.86V, the predetermined minimum level or the sustainable voltage level of a fully charged battery, the current then turns ON and remains on until the voltage again reaches the maximum level whereupon it shuts OFF again. This process continues through the taper charge phase II with the duty cycle of the charging current gradually decreasing as the battery's charge is built up.

Figure 14:
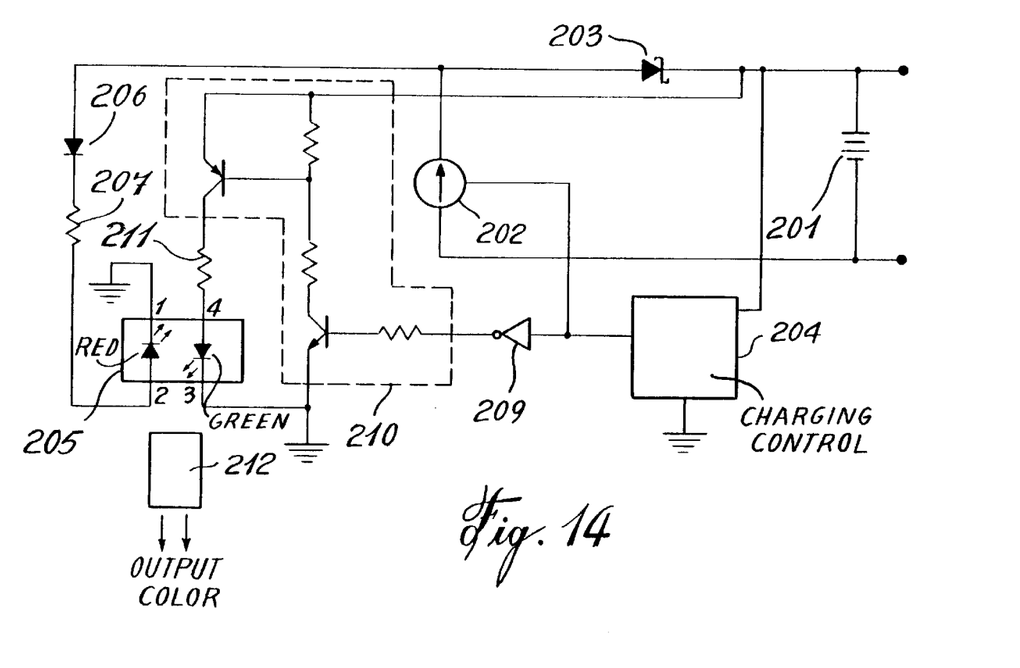
FIG. 14 a schematic diagram of the circuit which implements one preferred embodiment of battery monitoring circuitry for a charging phase of a battery.

FIG. 14 depicts the circuitry of the preferred embodiment of the present invention which indicates the state of charge of a battery during the charging process. Therein, battery 201 is being charged by a current source 202 through Schottky diode 203. Charging control circuit 204 monitors the battery voltage and controls the battery charging process. At first, the battery voltage is low. In this case when the system is in a fast charge mode phase I of FIG. 13, charging control circuit 204 output is high and the current is continuously supplied to the battery. Voltage is thus present at the anode of Schottky diode 203. During this period, current is sent to the red LED of the dual LED device 205 through diode 206 and resistor 207. Consequently, the output color will be red. As the battery is being charged, the voltage threshold, the maximum level is eventually reached and charging control circuit 204 issues a signal to turn OFF the current source 202. Thus, since no current is available, the red LED shuts OFF. However, through inverter circuitry 209, the signal from the charging control circuit 204 is transmitted to buffer 210. Thus, current will circulate through resistor 211 and the green LED of the dual LED device 205 emits light. Soon thereafter when the voltage falls to the predetermined minimum level and charging control circuit 204 turns the current source ON again. Thus, the red LED is turned back ON and the green LED is turned OFF. Phase II of FIG. 13, the taper charge phase of the charging process has now begun. As battery 201 is being charged, the green LED and the red LED are thus alternately turned ON and OFF by pulses of current. As the battery approaches full charge charging control circuit begins the trickle charge phase III FIG. 13 and the pulses of red light become progressively more infrequent and the pulses of green light become progressively longer.

Those skilled in the art will readily see now that by selection of a sufficiently fast pulse rate and the use of an appropriate color mixing device 212, as described in the invention herein, there will be a progressive change of color from red to green which will pass through the intermediate colors created by the varying intensities of a red and green light as the battery is discharged The key to obtaining a smooth transition between the colors selected, such as green to red or visa versa, in the preferred embodiment, is control of the period T of the current pulses. $T_1$, $T_2$ and $T_3$ in FIG. 13 are illustrative of a few periods T. Thus, T marks the time from the start of one pulse to the start of the following pulse. In order to assure that the user views a smooth transition between the colors it is only necessary to assure that the frequency $F=1/T$ is faster than about 24 times per-second. In the preferred embodiment a frequency range of 100 to 200 times per-second assures it will always be greater than about 24 times per-second. In the preferred embodiment the period T first decreases at the start of the taper charge period II but starts to increase again as the trickle charge period III approaches and then at some point stabilizes during the trickle charge period when the battery becomes fully charged. The frequency F and the period T should not be confused with the duty $t_{on}/T$ cycle which always decreases during the charging process because the current pulse $t_{on}$ such as $t_{on1}$, $t_{on2}$, and $t_{on3}$ in FIG. 13 is always decreasing in relation to the period T until the end of the trickle charge period when the $t_{on}$ stabilizes at a minimum value.

B. Discharge Mode:

Discharging a battery with a known load will result in a voltage profile that can be used to evaluate the charge state. This information can be used to control the two variable light intensity sources. As the battery is being discharged, light intensity of one source is progressively reduced, while the intensity of the other source is progressively increased, as previously noted above. Thus, mixing the colors through a properly designed optical device creates a progressive color change. In the preferred embodiment of the present invention, red and green light sources such as a red LED and green LED are used. At the start of the discharge mode, the light is wholly green, but as the apparatus is used and the battery provides power to the apparatus and slowly drains, the intensity of the green LED gradually decreases, while the intensity of the red LED will gradually increase. This will thus provide the user with a gradual progression through all of the possible colors which can be created by varying intensities of green and red, from the green end of the spectrum to the red end of the spectrum. Upon obtaining appropriate familiarity with the functioning of a particular apparatus through repetitive use, the user will quickly become familiar with which color hues indicate the particular state of charge of the battery.

Figure 15:
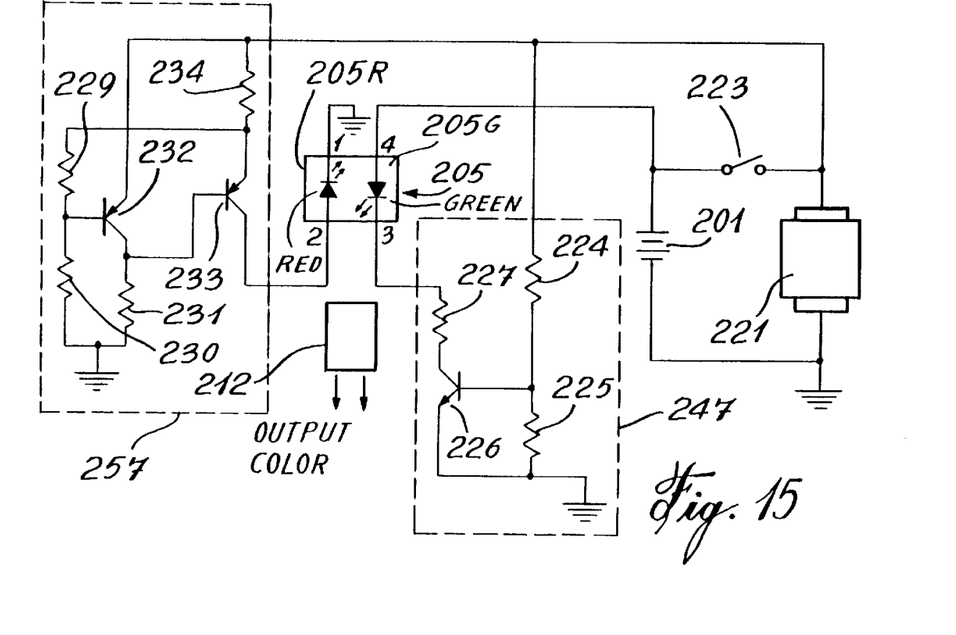
FIG. 15 a schematic diagram of the circuit which implements another preferred embodiment of battery monitoring circuitry for a discharge phase of a battery.

FIG. 15 provides the circuitry which would implement this particular preferred embodiment. In FIG. 15, motor 221 is being driven by battery 201 through switch 223. Resistors 224 and 225, in conjunction with transistor 226, form a voltage-to-current amplifier. Current flowing through resistor 227 and the green LED of dual LED device 205 will progressively decrease as the battery is being discharged. Resistors 229, 230 and 231 form with transistors 232 and 233, an inverting amplifier. Resistor 234 provides negative feedback in order to reduce the amplifier gain. Thus, as the battery is discharged, current flowing through resistor 234 and the red LED of dual LED device 205 increases. By selection of an adequate or appropriate color mixing device 212, or such as that described elsewhere in this specification, there will be provided a progressive change of color from green to red through intermediate colors, as the battery is being discharged.

As will be appreciated by those skilled in the art, in FIG. 15 the sub-circuitry 247 formed by resistors 224, 225, 227 and transistor 226 senses the voltage of the battery 201 and based on this signal generates a control signal which controls the intensity of the green LED 205G. Sub-circuitry 247 in fact acts as a voltage to current amplifier. As the voltage of the battery drops as result of its driving a load, i.e. the motor 221, the signal generated by sub-circuitry 247 also falls and causes the green LED 205G to become progressively dimmer. While voltage to current amplifier 247 will produce a useable signal, it will not create a perfectly linear progression from intense green to the shut OFF of the green LED. Such a progression will vary from device to device and it will not be uniform. Circuitry could be added to produce a perfectly linear and calibrated signal which will produce a uniformly dimming LED. However, such circuitry would add significantly to the cost and size of the apparatus. Additionally, such circuitry to refine the signal is not needed given the object of the present invention. As noted above, the user of the apparatus would quickly become accustomed to the specific characteristics of his or her own apparatus.

Sub-circuitry 257 has a similar but opposite effect as sub-circuitry 247 in that sub-circuitry 257 causes red LED 205R to become progressively brighter as the voltage of battery 201 falls as battery 201 drives a load motor 221. Sub-circuitry 257 is also a voltage to current amplifier. Sub-circuitry 257 senses the voltage level of battery 201 and generates a current which increases the intensity of LED 205R as the voltage of battery 201 falls.

Thus, both sub-circuits 247 and 257, acting as voltage to current amplifiers, sense the same signal, the voltage level of the battery and each in turn generate a signal which controls the dimming light of green LED 205G and the brightening light of red LED 205R are mixed in an appropriate light pipe 212, such as that described herein and they produce a smooth transition from a green exit surface on the light pipe 212 when the battery is fully charged function of the respective LED to which they are connected. In the present case, during the discharge cycle, through all of the various intermediate hues to a red hue at the exit surface when the battery 201 has fully discharged.

Figure 16:
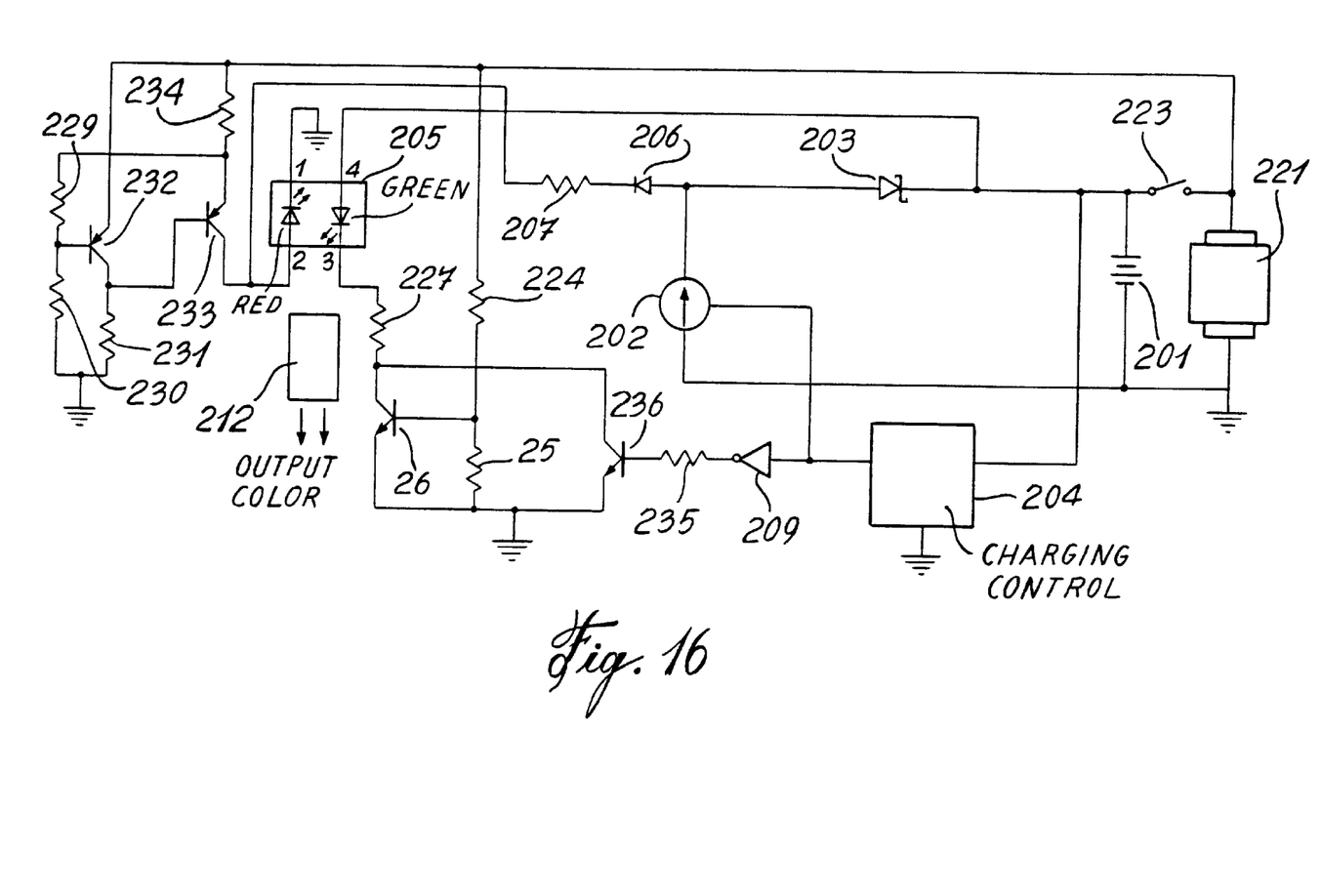
FIG. 16 a schematic diagram of the circuit which implements a third preferred embodiment of battery monitoring circuitry for both a charging phase and a discharge phase of a battery.

C. Combined Charge and Discharge Mode:

Many variations of the preferred embodiment can be created without departing from the spirit of this invention. One such preferred embodiment is illustrated in FIG. 16. It combines both the features of FIGS. 14 and 15. In FIG. 16, buffer 210 of FIG. 14 is replaced by a non-inverting buffer composed of resistors 235 and transistor 236. When charging the battery, this current will behave as that of FIG. 14. The circuit will behave as that of FIG. 15 when discharging.

While the invention has been particularly shown and described with reference to a preferred embodiment thereof, it will be understood by those skilled in the art that various changes in form and detail may be made to it without departing from the spirit and scope of the invention.

What is claimed is:

1. A compact light diffusing and mixing structure for uniformly dispersing at an exit surface light from a light source, said light diffusing structure comprising:

a light entrance surface and a light exit surface located on the light diffusing and mixing structure;

a light dispersing assembly in the light diffusing and mixing structure between the entrance and exit surfaces, which breaks up light into a plurality of sub-beams having different directions;

a light spreading reflective surface located in the light diffusing and mixing structure adjacent to the light dispersing assembly;

the light diffusing structure works such that light from the light source on entering the entrance surface strikes the light dispersing assembly and a first portion is guided directly towards the exit surface and a second portion is guided towards the light spreading reflective surface which in turn spreads the light towards the exit surface and thereby evenly spreads the light across the exit surface; and wherein a proportion of light in said sub-beams is substantially independent of a precise alignment of the light source with respect to the entrance surface, and the exit surface is substantially larger than the entrance surface.

2. The structure of claim 1 wherein the light dispersing assembly comprises a light diverter and an adjacent light guide wherein the light diverter and the light spreading reflective surface are mutually configured such that the first portion of the light which the light diverter directs towards the light spreading reflective surface is reflected towards the exit surface in a first predetermined pattern and second portion of the light which is directed directly towards the exit surface by the light guide in a second predetermined pattern.

3. The structure of claim 1 wherein the entrance surface has a light diffusing texture.

4. The structure of claim 1 wherein the exit surface has a light diffusing texture.

5. The structure of claim 1 wherein a light source is positioned so it illuminates the entire entrance surface.

6. The structure of claim 1 wherein a light source is at least one light emitting diode.

7. The structure of claim 6 wherein the at least one light emitting diode comprises two light emitting diodes of different colors whereby varying the intensity of the diodes changes the color of light at the exit surface.

8. The structure of claim 6 wherein the at least one light emitting diode can be positioned at between 0.5 to 1.5 mm from the entrance surface.

9. The structure of claim 1 wherein the structure is made of a light transmissive solid body and wherein said light dispersing assembly and said spreading reflective surface utilize TIR.

10. The structure of claim 9 wherein the light dispersing assembly further comprises a second beam diverter situated such that the light guide is sandwiched between the first and second beam diverter and wherein the second beam diverter has a second light spreading reflective surface adjacent to it and the second beam diverter and the second light spreading reflective surface are mutually configured such that a third portion of the light that the second beam diverter directs towards the second reflective surface is reflected towards the exit surface in a third predetermined pattern, whereby the first, second and third predefined patterns together evenly diffuse the light across the exit surface.

11. The structure of claim 10 wherein the light dispersing assembly is positioned adjacent to the entrance surface and wherein the first and second light diverters are triangular hollow cavities in the light diffusing and mixing structure each of which has an active surface, the active surface being a flat plane positioned at an angle of 45 degrees to a plane of the entrance surface, but the active planes of the first and second diverter are in mutually opposite orientations so that they divert the first and third portions of the light at 180 degrees away from each other towards their adjacent light spreading reflective surfaces which light spreading reflective surfaces are curved surfaces and the light guide sandwiched there between is a flattened thin plate structure.

12. The structure of claim 11 wherein the light source is at least two light sources of different color and whereby varying the intensity of each of the at least two light sources produces a uniformly intense single hue of a selected color at the exit surface.

13. The structure of claim 1 wherein the light spreading reflective surface collimates the first portion and directs it at an angle towards the exit surface so that it spreads the first portion out over the exit surface.

14. The structure of claim 1 wherein the exit surface is three to six times the size of the entrance surface.

15. A method for mixing and diffusing light in a small area to provide uniform illumination on a visual display, said method comprising the steps of:
   generating at least one light beam;
   breaking the at least one beam of light into a plurality of sub-beams having different directions and proportions of light substantially independent of a position of said at least one light beam within a predefined area;
   diffusing the plurality of sub-beams in a predefined pattern so that the cross sectional area of each of the plurality of beams increases to a predetermined size;
   projecting the plurality of sub-beams onto a visual display surface in an additively uniform pattern; and
   whereby the sub-beams of light striking the visual display present a uniformly intense dispersion of light across the visual display and the area of a plane of the visual display is substantially larger than a cross sectional area of the at least one beam of light generated.

16. The method of claim 15 wherein the step of generating the at least one beam of light further comprises the steps of:
   generating at least two beams of light, each beam being of a different color;
   varying the intensities of each beam in a predetermined format so that a predesignated color of uniform hue and intensity appears on the visual display.

17. The method of claim 16 wherein the step of generating at least one beam comprises generating two beams of the same color light and wherein any variation in the intensity of either beam does not affect the uniformity or intensity of the light as it appears on the visual display.

18. An indicator device which comprises:
   at least two light sources of different colors;
   a light pipe with a light exit surface and an entrance surface of the light pipe receiving light from said at least two light sources, said pipe mixing light from said sources, said light exit surface being positioned for viewing by a user of an electronic apparatus; and
   circuitry operatively connected to a single variable signal representing a state of the apparatus, said circuit in turn is operatively connected to the light sources which light sources are each responsive to an intensity control signal generated by the circuit in response to the single variable signal indicative of the state, such that the light sources produce at the exit surface of the light pipe a unique color visual indication of the state.

19. The device of claim 18 wherein the single variable signal is indicative of a state of charge of a battery which powers the electronic apparatus.

20. The device of claim 19 wherein the state of charge of the battery of which the signal is indicative is the state of charge of the battery during a charging of the battery.

21. The device of claim 20 wherein the at least two light sources are a first LED and a second LED, and the variable signals generated by the circuit in response to the single variable signal are a first signal which causes the first LED to lose intensity during the charging of the battery and turn OFF when the battery is filly charged, and a second signal which causes the second LED to turn ON and increase in intensity during the charging of the battery, whereby the hue of light created at the exit surface by the mixing of the light from the LEDs by the light pipe is indicative of the charge of the battery.

22. The device of claim 19 wherein the state of charge of the battery of which the signal is indicative is the state of charge of the battery during a discharging of the battery.

23. The device of claim 22 wherein the at least two light sources are a first LED and a second LED, and the variable signals generated by the circuit in response to the single variable signal are a second signal which causes the second LED to lose intensity during the discharging of the battery and turn OFF when the battery is fully discharged, and a first signal which causes the first LED to turn ON and increase in intensity during the during the discharging of the battery, whereby the hue of light created at the exit surface by the mixing of the light from the LEDs by the light pipe is indicative of the charge of the battery.

* * * * *